3,544,527
NOVEL MOISTURE RESISTANT POLYAMIDES FROM A DIAMINE HAVING AT LEAST ONE PIPERIDYL GROUP
Edward W. Pietrusza, Morristown, and Jack R. Pedersen, Parsippany, N.J., assignors to Allied Chemical Corporation, New York, N.Y., a corporation of New York
No Drawing. Filed Jan. 25, 1968, Ser. No. 700,344
Int. Cl. C08g 20/20
U.S. Cl. 260—78                8 Claims

ABSTRACT OF THE DISCLOSURE

This specification discloses novel moisture resistant, heat stable polyamides derived from 4,4'-dichlorocarbonyldiphenylsulfone and a diamine having at least one piperidyl group. The polyamides can be formed into useful fibers, films and molded articles.

---

Polyamides, particularly the nylons, have found wide commercial acceptance due to their ability to form useful articles having great strength. However, these polyamides have certain disadvantageous properties which have limited their use for particular applications. For example, the nylons have relatively low melting points and they lose a substantial portion of their strength at temperatures much lower than their melting points, e.g., at about 150° C. or less. In addition, the nylons are sensitive to moisture and lose their strength at high relative humidities or when exposed to water. The nylons also have comparatively low glass transition temperatures, and they lose their ability to withstand an applied stress at temperatures of about 40–55° C. There has been a long felt need for high strength polyamides which retain their high strength properties at elevated temperatures and have improved moisture resistance.

Fully aromatic polyamides are known that have very high melting points and thus are stable at elevated temperatures, such as those disclosed by H. W. Hill et al. in U.S. Pats. 3,094,511 and 3,322,728. However, the high melting points of these polymers, which range from about 350–400° C. or higher, preclude forming operations using conventional molding and extrusion equipment and procedures.

It is an object of the present invention to provide novel, low melting polyamides which retain their high strength properties at temperatures of 150° C. or higher.

It is another object to provide novel polyamides which are resistant to moisture.

It is a further object to provide novel polyamides which are stable at elevated temperatures and can be molded using conventional equipment.

It is another object to provide a process for the preparation of moisture resistant polyamides which are stable at elevated temperatures.

Further objects will become apparent from the following detailed description thereof.

We have discovered that polymers prepared from 4,4'-dichlorocarbonyldiphenylsulfone and a diamine coreactant selected from the group consisting of $$HN\left\langle S \right\rangle-R-\left\langle S \right\rangle NH$$

and $$HN\left\langle S \right\rangle-R-NH_2$$

wherein R is a lower alkylene group of 1 to 6 carbon atoms, are strong, moisture resistant polyamides which retain their high strengths at elevated temperatures. These polyamides have high glass transition temperatures, much higher than those of nylon, and thus articles prepared from the polyamides of the invention retain their dimensional stability and resist deformation at high temperatures as well.

The linear polyamides of the invention have recurring units selected from the group consisting of $$\left(\begin{array}{c}O\\\|\\-C\end{array}-\left\langle\ \right\rangle-\overset{O}{\underset{\|}{S}}-\left\langle\ \right\rangle-\overset{O}{\underset{\|}{C}}-N\left\langle S\right\rangle-R-\left\langle S\right\rangle N-\right)$$

and $$\left(\begin{array}{c}O\\\|\\-C\end{array}-\left\langle\ \right\rangle-\overset{O}{\underset{\|}{S}}-\left\langle\ \right\rangle-\overset{O}{\underset{\|}{C}}-N\left\langle S\right\rangle-R-NH-\right)$$

wherein R is defined as above.

The novel polyamides of the invention can be prepared by reacting equimolar amounts of 4,4'-dichlorocarbonyldiphenylsulfone with a diamine compound containing at least one piperidyl ring in a catalyzed solution under anhydrous conditions at moderate temperatures and normal pressures.

4,4'-dichlorocarbonyldiphenylsulfone can be prepared by reacting 4,4'-dicarboxydiphenylsulfone with a solution of phosphorous pentachloride and phosphorus oxychloride. The excess phosphorus oxychloride is distilled off and the product can be isolated by distillation or recrystallization from a suitable solvent.

The diamines suitable for use in the process of the invention include 1,1-di-4-piperidyl methane, 1,3-di-4-piperidyl propane, 2,2-di-4-piperidyl isopropane, aminomethyl piperidine, aminopropyl piperidine, aminohexyl piperidine and the like. Diamines containing two piperidyl groups give polyamides which are especially preferred due to their high moisture resistance.

According to our process, equimolar amounts of 4,4'-dichlorocarbonyldiphenylsulfone and a diamine as described hereinabove are reacted in a catalyzed solution at least until the evolution of hydrogen chloride has ceased. By varying the conditions of time and temperature of the reaction, the concentration of the reactants and the particular diamine employed, a wide range of polyamides can be prepared having determinable molecular weights and properties. Copolyamides can also be prepared by employing a mixture of diamines.

Equimolar amounts of 4,4'-dichlorocarbonyldiphenylsulfone and diamine are preferred in our process since the presence of an excess of either reactant will act as a terminator for the polymerization reaction, resulting in the formation of low molecular weight polymers.

The solvent should be a solvent for both the 4,4'-dichlorocarbonyldiphenylsulfone and the diamine and preferably for the resultant polyamide as well, although this is not required. In general, aromatic hydrocarbons and halogenated aromatic hydrocarbons are solvents which can be employed in the process of the invention, including benzene, toluene, o-, m- and p-xylene, p-cymene, diphenylmethane, 1,3,5-triethylbenzene, chlorobenzene, o-dichlorobenzene, 1,2,4-trichlorobenzene and the like. In general, the use of higher boiling solvents will result in the formation of higher molecular weight polymers.

Effective catalysts include metals such as magnesium, zinc, aluminum and metal salts such as cuprous chloride. Additional metals and metallic salts which are effective as catalysts in the process of the present invention can be determined by one skilled in the art by test runs. The catalyst concentration can be from about 0.01 to about 2.0% by weight of the reactants. In the absence of an effective catalyst, low molecular weight polymers may be obtained. Particularly outstanding results are obtained using magnesium metal as the catalyst.

The polymerization reaction proceeds readily at the reflux temperature of the reaction mixture, which depends upon the boiling point of the particular solvent employed during the polymerization. In general, the rate of polymerization will increase at higher reaction temperatures.

The time required for formation of high molecular weight polyamide will vary depending upon the temperature of the reaction, the purity of the reactants and the choice of catalyst. The reactants and the solvent must be essentially free of impurities and water which cause degradative side reactions and chain termination and prevent the formation of high molecular weight polymers. Increasing the time of reaction increases the molecular weight of the resultant polyamide with an accompanying increase in the flow or melting temperature and the decomposition temperature of the polymer.

The product can be isolated in any conventional manner as will be known to one skilled in the art. One method is to filter off the catalyst and pour the solution into a nonsolvent for the polymer, thereby precipitating it. The precipitated polymer is then washed and dried.

The polyamides of the present invention are high melting, thermoplastic polymers suitable for use as fibers, films, molded articles and the like formed according to conventional processing techniques such as molding, extrusion, etc. The polyamides are also useful as coatings which offer protection from the effects of elevated temperature. In addition to the polyamides, copolymers can be prepared from mixtures of diamines and also by forming an amine salt of the 4,4'-dichlorocarbonyldiphenylsulfone and copolymerizing it with caprolactam.

The invention will be illustrated further by the examples given below but it is to be understood that the invention is not meant to be limited to the details disclosed therein. In the examples, all parts and percentages are by weight unless otherwise indicated.

The reduced viscosity of the polymers was determined as a 0.5% by weight solution in a solvent at 25° C. The solvent is m-cresol unless otherwise noted.

Glass transition temperatures were determined by differential thermal analysis. Ultimate elongation, yield strength and 2% secant modulus were determined according to ASTM test D638–64T (using tensile impact specimens at 2″/min.$^{-1}$ headspeed). Melt index was determined according to ASTM test D1238–65T at 285° C. under a 2160-gram load.

EXAMPLE 1

86 parts of 4,4'-dichlorocarbonyldiphenylsulfone were charged to 1000 parts by volume of o-dichlorobenzene in a vessel fitted with a stirrer, nitrogen inlet and outlet and means of heating. The mixture was heated to 150° C. and a solution containing 52.5 parts of 1,3-di-4-piperidyl propane in 300 parts by volume of o-dichlorobenzene was added. 0.5 part of magnesium powder was added and the mixture heated at reflux for 6.5 hours. The mixture was cooled to room temperature and the solvent decanted off. The polymer product was dissolved in dimethylformamide, the solution filtered and the polymer precipitated in isopropanol and dried. 100 parts of product were recovered.

The polymer had a reduced viscosity of 0.78, a melting point range of 235–255° C. and a glass transition temperature of 180° C. The melt index was 0.5.

EXAMPLE 2

52.5 parts of 1,3-di-4-piperidyl propane, 86 parts of 4,4'-dichlorocarbonyldiphenylsulfone, 0.3 part of powdered magnesium and 500 parts by volume of o-dichlorobenzene were refluxed in a vessel as in Example 1 for 19 hours under nitrogen. A viscous mass settled out on cooling and the solvent was decanted. The product was dissolved in 200 parts by volume of dimethylformamide heated to 100° C., filtered and methanol added to reprecipitate the polymer. The polymer product was washed with methanol and dried at 90° C. in a vacuum oven.

94 parts of a polymer having a reduced viscosity of 0.66, a melting point of 230–260° C. and a glass transition temperature of 180° C. were obtained. The melt index was 1.3.

The polymer was exposed to a temperature of 285° C. for 7 minutes. The reduced viscosity had increased to 0.73.

A portion of the polymer was compression molded at 260° C. Physical property determinations were made at various temperatures and compared to polycaprolactam (nylon 6) having a reduced viscosity of 1.8 and a glass transition temperature of 40° C. The results are given in the table below:

| Temperature of test | Product | Ultimate elongation, percent | Yield strength p.p.s.$\times 10^{-3}$ | 2% secant modulus$_3$ p.s.i.$\times 10^{-}$ |
|---|---|---|---|---|
| 23° C | Ex. 2 | 16 | 15.2 | 110 |
|  | Nylon 6 | 11 | 12.3 | 186 |
| 150° C | Ex. 2 | 11 | 5.6 | 75.9 |
|  | Nylon 6 | 77 | 3.3 | 12.2 |

The ultimate elongation of the product of the invention remained unchanged at 180° C. and the modulus of the product at 180° C. was substantially higher than that of nylon 6 at 150° C. Thus, it is readily apparent that the physical properties of the polyamide of the invention are much less affected at elevated temperatures than nylon 6.

The stability to water of molded samples of the polyamide of the invention was compared to nylon 6 by immersing a sample of each polymer in water for 5 days at 50° C. The properties were measured at 23° C. The results are given below:

| Product | Ultimate elongation, percent | Yield strength, p.s.i.$\times 10^{-3}$ | 2% secant modulus, p.s.i.$\times 10^{-3}$ | Water absorption, percent |
|---|---|---|---|---|
| Ex. 2 | 17 | 13.8 | 109 | 3.6 |
| Nylon 6 | 78 | 4.0 | 16 | 9.0 |

Thus the polyamide of the invention has a very low water absorption as compared with conventional nylon 6 and its physical properties are essentially unaffected by exposure to water over an extended period.

EXAMPLE 3

5.15 parts of 4,4'-dichlorocarbonyldiphenylsulfone, 3.20 parts of 1,3-di-4-piperidyl propane, 0.05 parts of powdered magnesium and 200 parts by volume of o-dichlorobenzene were charged to a vessel as in Example 1 and refluxed for 5 hours. The polymer product precipitated on cooling and was collected and dried.

The polymer had a reduced viscosity of 1.82, a melting point range of 270–285° C. and a glass transition temperature of 180° C.

A portion of the product was dissolved in dimethylformamide and cast into a self-sustaining, flexible film. The film had the following properties: ultimate elongation, 12.3%; ultimate tensile strength, 10,370 p.s.i.; and 2% secant modulus, 123,330 p.s.i.

EXAMPLE 4

5.4 parts of aminomethylpiperidine, 17.15 parts of 4,4'-dichlorocarbonyldiphenylsulfone, 0.1 part of powdered magnesium and 400 parts by volume of o-dichlorobenzene were refluxed in a vessel as in Example 1 for 24 hours. A solid formed shortly after refluxing began. The polymer product was washed with acetone and dried.

17 parts of polymer having a reduced viscosity of 0.14 (determined in sulfuric acid) and a softening point of 280–285° C. were obtained.

It is apparent that numerous modifications and variations may be effected without departing from the novel

We claim:

1. Film and fiber forming moisture resistant, heat stable polyamides consisting essentially of recurring units of a formula selected from the group consisting of

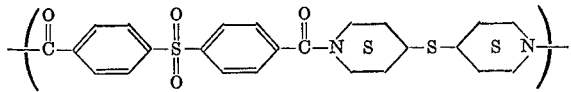

and

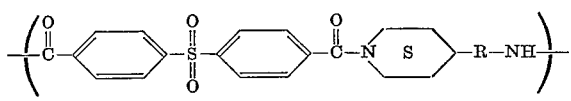

wherein R at each occurrence is an alkylene group of from 1 to 6 carbon atoms.

2. A polyamide according to claim 1 wherein said polyamide consists essentially of recurring units of the formula

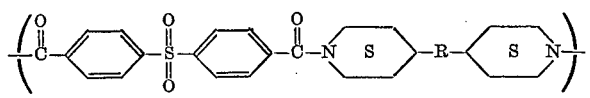

3. A polyamide according to claim 2 wherein R is a propylene group.

4. The polyamide of claim 1 in the form of a self sustaining film.

5. A process for the preparation of moisture resistant, heat stable polyamides which comprises refluxing equimolar amounts of 4,4'-dichlorocarbonyldiphenylsulfone with a coreactant selected from the group consisting of diamines having the formula

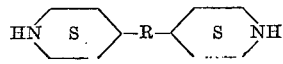

and

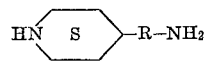

wherein R is an alkyl group of 1 to 6 carbon atoms in an aromatic hydrocarbon or halogenated aromatic hydrocarbon solvent in the presence of a catalyst selected from the group consisting of magnesium, zinc, aluminum and cuprous chloride in an amount of from about 0.01 to about 2.0% by weight of the reactants.

6. A process according to claim 5 wherein said diamine is 1,3-di-4-piperidyl propane.

7. A process according to claim 5 wherein said diamine is aminomethylpiperidine.

8. A process according to claim 5 wherein said solvent is o-dichlorobenzene and said catalyst is magnesium.

References Cited

UNITED STATES PATENTS

| | | | |
|---|---|---|---|
| 3,094,511 | 6/1963 | Hill et al. | 260—78 |
| 3,371,068 | 2/1968 | Preston et al. | 260—78 |

HAROLD D. ANDERSON, Primary Examiner

U.S. Cl. X.R.

260—30.8, 32.6, 33.6, 33.8

PO-1050
(5/69)

UNITED STATES PATENT OFFICE
CERTIFICATE OF CORRECTION

Patent No. 3,544,527                Dated December 1, 1970

Inventor(s) Edward W. Pietrusza and Jack R. Pedersen

It is certified that error appears in the above-identified patent and that said Letters Patent are hereby corrected as shown below:

In the first claim, first formula -S- should be -R-.

In the specification, column 4, the first table, "Yield Strength p.p.s x $10^{-3}$" should be --Yield Strength psi x $10^{-3}$.

Signed and sealed this 20th day of April 1971.

(SEAL)
Attest:

EDWARD M. FLETCHER, JR.
Attesting Officer

WILLIAM E. SCHUYLER, JR.
Commissioner of Patents